G. KOCH.
WEAVING OF PILE FABRICS.
APPLICATION FILED NOV. 3, 1920.
Reissued Aug. 30, 1921.
15,184.
3 SHEETS—SHEET 1.
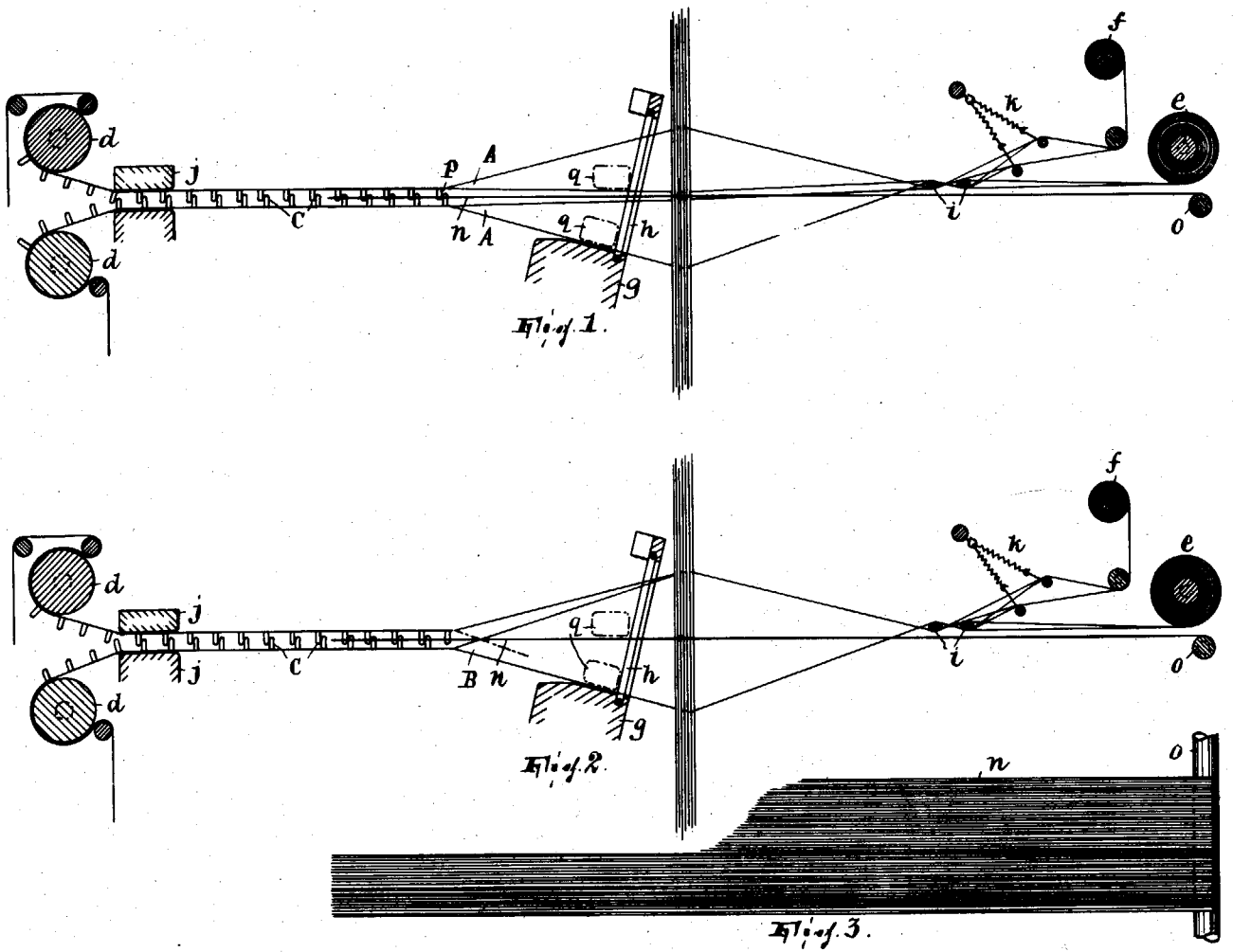
WITNESS:
Wm. Wrell.
INVENTOR,
George Koch,
BY
John W. Stewart.
ATTORNEY.

G. KOCH.

WEAVING OF PILE FABRICS.

APPLICATION FILED NOV. 3, 1920.

Reissued Aug. 30, 1921. 15,184.

3 SHEETS—SHEET 2.

WITNESS:

Wm. Drell.

INVENTOR,

George Koch,

BY

John Thurnand.

ATTORNEY

G. KOCH.
WEAVING OF PILE FABRICS.
APPLICATION FILED NOV. 3, 1920.
Reissued Aug. 30, 1921.
15,184.
3 SHEETS—SHEET 3.
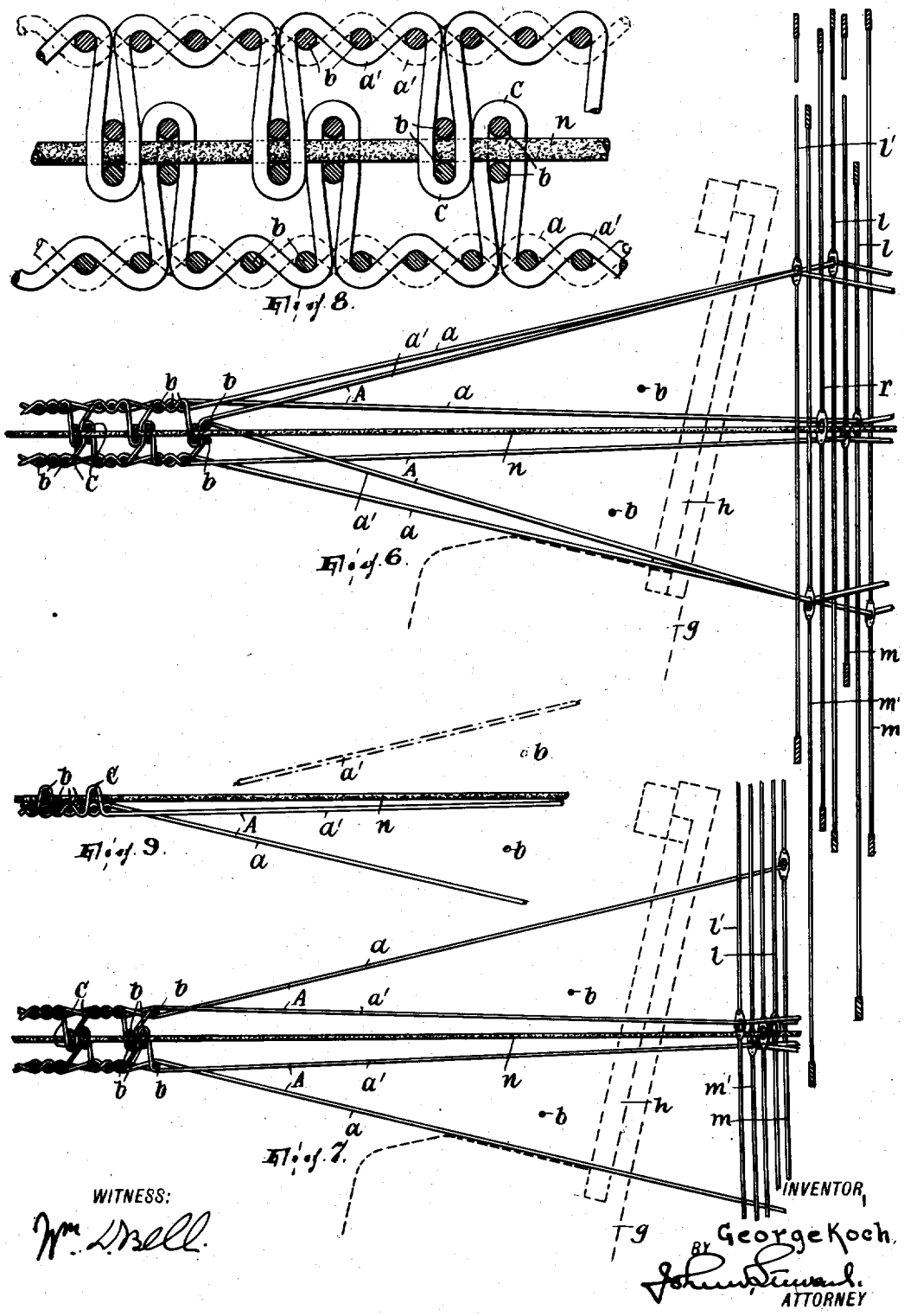
WITNESS:
Wm. L. Bell.
INVENTOR,
George Koch.
BY
John Ewart.
ATTORNEY

UNITED STATES PATENT OFFICE.

GEORG KOCH, OF DARMSTADT, GERMANY, ASSIGNOR TO ERNEST CADGENE AND OLAV BERG, BOTH OF PATERSON, NEW JERSEY.

WEAVING OF PILE FABRICS.

15,184. Specification of Reissued Letters Patent. Reissued Aug. 30, 1921.

Original No. 1,305,373, dated June 3, 1919, Serial No. 270,300, filed January 9, 1919. Application for reissue filed November 3, 1920. Serial No. 421,595.

*To all whom it may concern:*

Be it known that I, GEORG KOCH, a citizen of Germany, residing at Darmstadt, State of Hessen, Germany, have invented certain new and useful Improvements in the Weaving of Pile Fabrics, of which the following is a specification.

This invention relates to pile weaving and particularly to a kind of pile weaving heretofore proposed in which attenuated weft supporting filaments having free ends projecting in the direction of advance of the warp as the weaving proceeds are adapted to coact with some of the threads of the warp to form sheds in addition to the ground sheds which are formed of the warp threads themselves, said sheds being adapted to receive filling which when beaten up will, by being supported by the said filaments, cause pile loops to be formed in the warp threads coacting with said filaments to form said sheds. One of the principal objects of the invention is to form a fabric by this kind of pile weaving which shall be very tight and compact and hence very sturdy and durable. Another object is to provide a method in this kind of weaving whereby two fabrics may be woven at the same time in a certain advantageous manner.

It has been proposed to provide weft supports of vertically arranged groups of threads, or of bands disposed in vertical planes, standing side by side (for example, Gaudonnet's French Patent No. 403,150). My invention distinguishes from this in that every filamentous body representing a weft support stands in the same plane with every other such body, so that not having to contend with disarrangement or distortion under vertical pressure (as of such a thread group or band) the manipulations incident to shedding and beating up may, and in fact in practice are made to, bind the weft supports very tightly in the fabric; this is of vital importance where a tight, compact and hence durable fabric is wanted, and where, furthermore, it is desired that the height of the pile of the fabric should be precisely uniform, loop for loop, throughout. It also of course makes it possible to make a fabric with an exceedingly low pile. The anchorage for the supports, afforded by the beam *o*, is of course normally fixed or unyielding, so that a constant degree of resistance to the advance of the supports with the fabric as it advances is present: the extent of the grip which the fabric has on the supports being an important factor in the tightness and compactness of the weave it follows that uniformity in the tightness and compactness throughout the length of the finished fabric will result if the said anchorage offers constant resistance to advance of the supports.

In my method of two-fabric weaving herein set forth the pile may obviously be formed as low as is wanted or as high as is wanted, depending upon the distance apart in which the weaving planes exist.

In the drawings,

Figures 1 and 2 are diagrammatic views showing the essentials of the improved loom as adapted for delivering two fabrics at once with uncut pile, Fig. 1 illustrating the sheds appertaining to the ground and Fig. 2 those appertaining to the pile;

Fig. 3 shows in plan the series of attenuated supports;

Figs. 4, 5, 6 and 7 show the heddles, warps, filling and the said supports, diagrammatically and on a magnified scale, at four different stages in the production of two rows of pile loops, one for each of the two fabrics being produced as in Fig. 1;

Fig. 8 is a magnified longitudinal sectional view showing the fabrics being woven and the intervening attenuated supports, the ground warp threads of each fabric being here distinguished from the pile warp threads by dotted lines; and Fig. 9 is a diagrammatic view illustrating the invention in connection with the weaving of a single fabric.

Referring, first, to Figs. 1 to 8 of the drawings: The threads of the warp which go into the ground of each fabric are designated *a*; those which form the pile are designated *a'*. The filling threads are denoted *b*. The means for supporting and advancing the warp and beating up the filling to the fell of each fabric are shown as well-known instrumentalities, such as take-up means including the take-up rollers *d*, let-off means herein shown as including let-off beams *e* and *f* (one of which is for the ground warp threads and the other for the pile warp threads), the lay or batten *g* carrying a reed *h* and adapted to move forward after each shot of filling in the usual manner, lease rods *i*, and spaced breast-beams *j*; it will be understood that the beam *f* is calculated, in any well known way, to deliver the pile warp threads at the required rate to produce the height of the pile desired, and *k* designates a known form of yielding means to keep the pile warp threads in a state of tension. There are two sets of heddles, one appertaining to the upper and the other to the lower fabric; the former are designated *l l l'* and the latter *m m m'*, those designated *l'* and *m'* being the ones which control the pile warp threads and the rest the ones which control the ground warp threads. The attenuated supports *n*, here shown as material, that is not only flexible but impressionable (*i. e.*, adapted to yield to the pressure of intersecting threads), as stout linen thread, are wound on a beam *o* at the back of the loom and extend forward between the heddles in a plane between the planes of weaving the two fabrics, terminating, preferably, suitably forward of the fells *p* of the fabrics. I find that the forward end portions of the supports *n* wear away, wherefore at times the beam *o* may be turned sufficiently to permit their advance upon cutting away the worn portion. There are two shuttles *q* for the filling, as is usually the case where two fabrics are woven face to face, adapted to be shot across the warp together one above and the other below the series of supports *n* from and to their boxes (not shown). Suitable means to keep the supports *n* from sagging may be provided, as the heddle *r*, which in the present case has no movement having to do with shed-forming.

Figure 4:
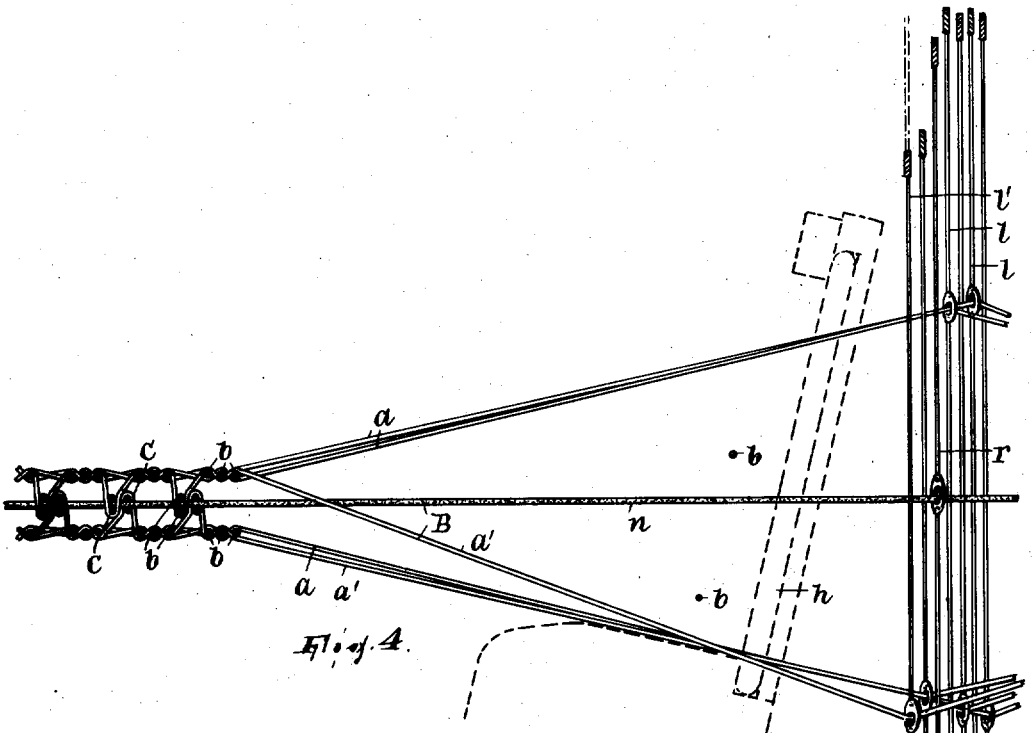
Figure 5:
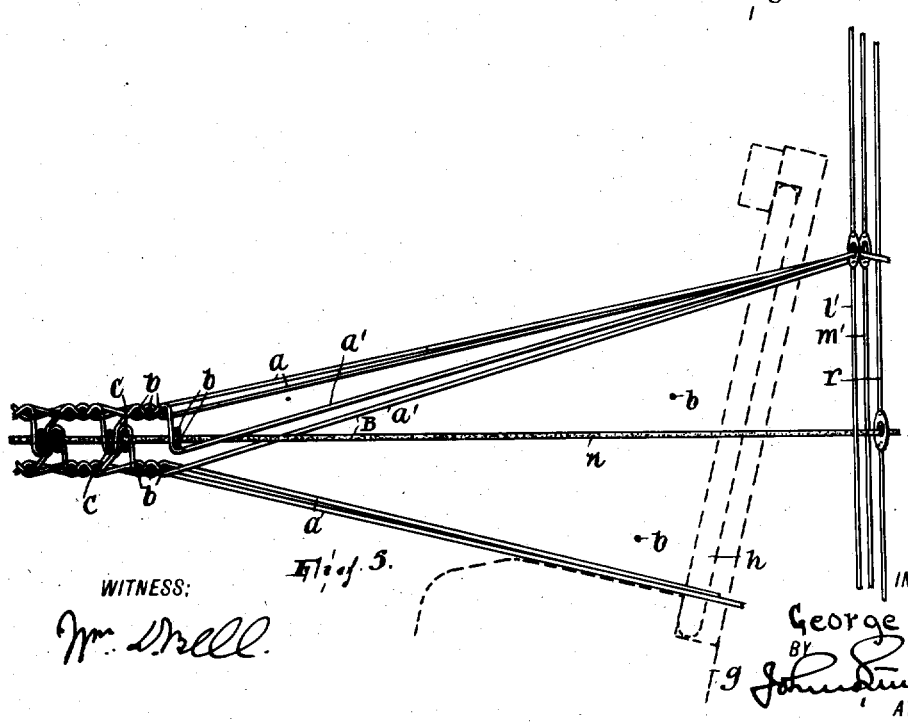

The weaving of each fabric in so far as the ground is concerned may proceed in any selected way: for example, in Figs. 4 to 8 it is assumed that heddles *l l* (or *m m*) reciprocate reversely to form a succession of (say three) ground sheds A, Fig. 7, each to receive a shot of filling *b*, which is beaten up by the reed *h* in the regular way; heddle *l'* (*m'*) for the pile threads of either warp is assumed to rise and fall with one of these two reversely reciprocating shafts. Then the heddle *l'* (*m'*) for the pile threads *a'* is shifted so that the latter decussate the supports *n* and form therewith a pile shed B (*i. e.*, independently of the companion threads *a* in the warp affected, and—so that the fabrics may issue unconnected with each other—independently also of all the threads of the opposite warp, all such threads being at this time retracted; see Fig. 4 or 5), whereupon shots of filling *b* are passed across the series of supports at opposite sides thereof, one through the shed B, and, upon the return of heddle *l'* (*m'*) beaten up by the reed. As the weaving proceeds the pile loops C which are formed around and supported by the filling *b*, in turn supported by supports *n* (which preferably project forward of the fell *p* of the cloth), advance beyond said supports and become no longer supported thereby; but by this time the pile threads forming them have become sufficiently well bound in to prevent disturbance of their pile loops C. In weaving two fabrics face to face at the same time it is an advantage, especially if the product is to have an uncut pile to weave them so that the pile of one will be unconnected with that of the other. This may be accomplished (excepting at the very edges, where the fabrics will be bound together for a reason to be explained) if, as shown in Figs. 1 to 8, the decussatings of the pile threads *a'* of the two warps are made to occur in alternation (not both at the same time, for then obviously the shots of filling *b b* which then ensue would interlock the two rows of pile, one for each fabric, formed); and at the time of decussating the pile threads *a'* of the warp of either fabric with respect to the supports *n* all the threads, both ground and pile, of the warp of the other fabric are by their heddles brought to a position relatively outside of the path of the adjoining shot of filling, *i. e.*, all above or all below the same, as the case may be (since otherwise they would form a shed through which the shot of filling that is to ensue for the support of the row of pile loops being formed would pass, with the consequence that said row of pile loops would become bound in the ground of said other fabric). Figs. 4 to 7 show four stages in weaving two fabrics face to face according to my invention and so that they will issue with uncut pile and clear of each other (Figs. 1 and 2). Thus, in Fig. 4 the pile shed B for the upper fabric is formed, and all of the threads of the warp of the lower fabric are shifted to a position relatively outside of the path of the shot of filling *b* which is to enter said shed B to form a row of pile loops for the upper fabric. In Fig. 5 the shots of filling *b b* in Fig. 4 having occurred and been beaten up, the pile shed B for the lower fabric is formed, and all of the threads of the warp of the upper fabric are shifted to a position relatively outside of the path of the shot of filling *b* which is to enter said shed B to form a row of pile loops for the lower fabric. In Fig. 6 the shots of filling *b b* in Fig. 5 having occurred and been beaten up, the warps of each fabric are brought to the positions necessary for forming the ground shed A therein, though the pile threads *a'* do not appear (especially in this mere diagrammatic illustration) in the same plane as the respective ground threads *a* for the obvious reason that said pile threads have not as yet commenced to be woven into the ground of the fabric. See, however, Fig. 7, where the pile threads *a'* are now assumed to be in process of being woven into the ground. On beating up the first filling that goes into the ground after forming a row of pile loops there is actually no such space as appears in the diagrammatic views 4 to 7 between such filling and the one next preceding it in the ground, but the fabric is closed more or less as it appears in Fig. 8. Although from one edge to the other the pile of the two fabrics will issue unconnected with each other as shown in Figs. 1 and 2 it will be apparent that they will be bound together at their very edges because, while the alternate arrangement of their rows of pile loops and the bringing of the warp of one fabric to a position relatively outside of the path of the adjoining shot of filling at the time of decussating the pile threads of the warp of the other fabric with respect to the supports *n* avoid the filling interlocking the two fabrics together across the same, nevertheless each shot of filling alternately passes out of a pile row of one fabric and into a pile row of the other; this slight connection, essentially formed by filling and only at the edges, may however obviously be severed in any way, as by a knife (not shown) entered into the folds in effect produced at the edges.

It will be obvious in view of the foregoing that a single fabric may be woven with uncut pile according to my invention, as in Fig. 9. Here the essential elements of the loom are assumed to be all the same as those for weaving either of the two fabrics shown in the first seven figures, the only difference being that the supports *n* lie in contact with the ground of the fabric and that since there is no occasion to provide against pile loops of another fabric being interwoven with the ground the warps *a a'* can, if desired, form sheds A for the ground uninterruptedly; also that provision is made for the filling which passes through the rows of pile loops (if two filling threads be employed, as herein shown) not being shot across excepting when the pile-forming sheds are formed.

Having thus fully described my invention, what I claim as new and desire to secure by Letters Patent is:—

1. A pile weaving loom including, in combination, instrumentalities to support and advance the warp longitudinally in a given plane, a set of impressionable filamentous weft-supporting bodies having free ends projecting in the direction of advance of said warp, every such body in the set being arranged in approximately the same plane substantially parallel with the first plane, means to form a succession of sheds in the warp and also form other sheds of some of the warp and said bodies, and means to pass filling through the first-named sheds at the side of said bodies corresponding to the first plane and also through said other sheds at the opposite side of said bodies, said bodies being held against forward movement.

2. A pile weaving loom including, in combination, instrumentalities to support and advance the warp longitudinally in a given plane, a set of impressionable filamentous weft-supporting bodies having free ends projecting in the direction of advance of said warp, every such body in the set being arranged in approximately the same plane substantially parallel with the first plane, means to form a succession of sheds in the warp and also form other sheds of some of the warp and said bodies, means to pass filling through the first-named sheds at the side of said bodies corresponding to the first plane and also through said other sheds at the opposite side of said bodies, and means non-yieldingly holding said bodies against forward movement.

3. In pile weaving, the hereindescribed method of weaving two fabrics face to face at once which consists in advancing two substantially parallel warps longitudinally and in substantially the same direction and with reference to attenuated filling supports arranged between said warps and having free ends projecting in substantially said direction, forming a succession of ground sheds of the threads of each warp and from time to time also forming independently of some of the threads of each warp and also of the threads of the opposite warp a shed of other threads of the first warp and said supports, and passing filling through each shed formed.

In witness hereof I affix my signature.

GEORG KOCH.